Patented Feb. 20, 1940

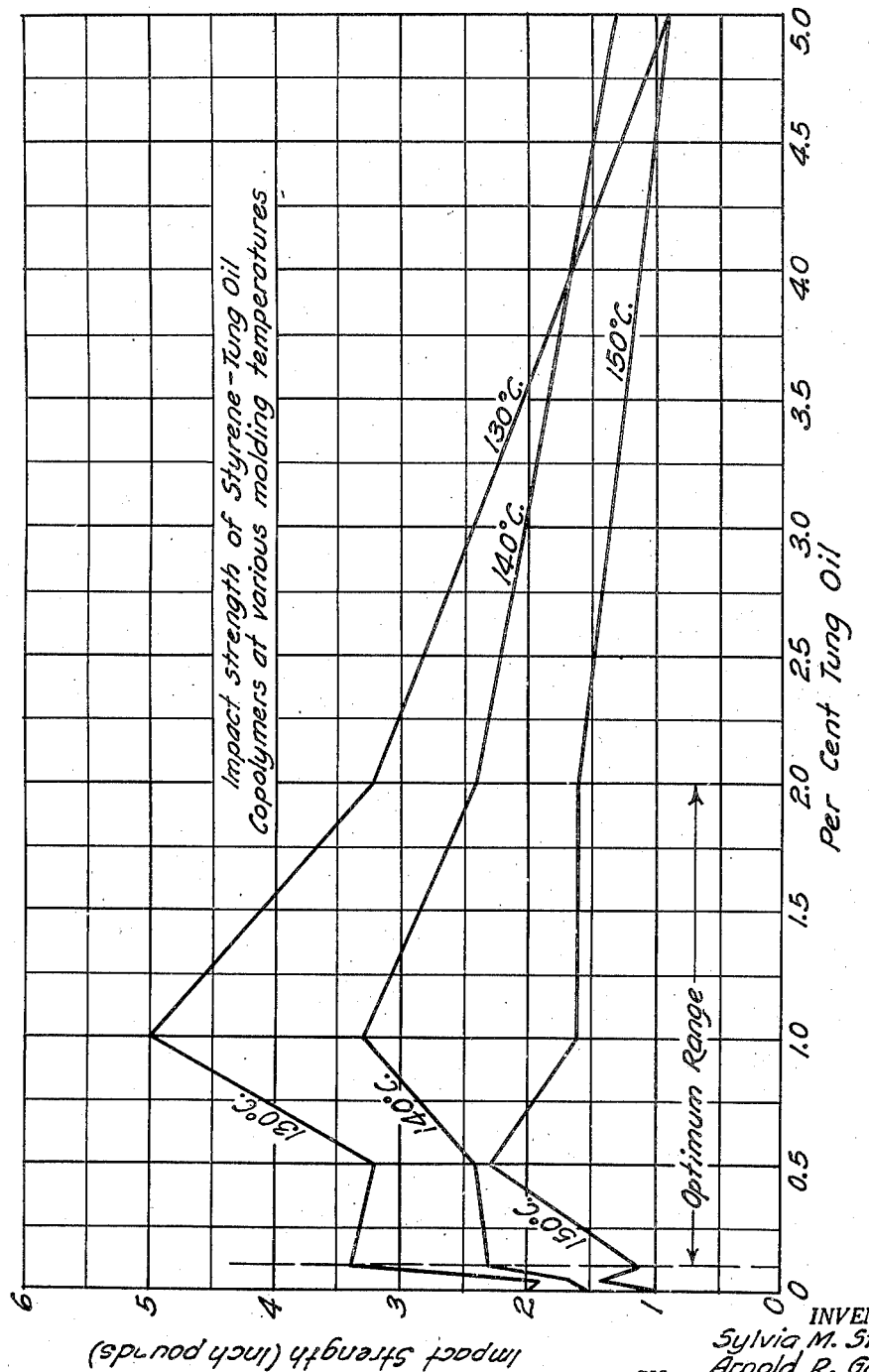

2,190,906

UNITED STATES PATENT OFFICE 2,190,906

STYRENE-TUNG OIL COPOLYMER

Sylvia M. Stoesser and Arnold R. Gabel, Midland, Mich., assignors to The Dow Chemical Company, Midland, Mich., a corporation of Michigan Application January 5, 1939, Serial No. 249,464

8 Claims. (Cl. 260—23)

The present invention relates to a new synthetic resin prepared from styrene and to a method of making the same.

This application is a continuation-in-part of our co-pending application Serial No. 155,248, filed July 23, 1937. In the earlier application it was disclosed that a mixture of styrene and a small proportion of tung oil may be polymerized to a resin which resembles polystyrene, but does not possess certain disadvantages inherent in that material. Further investigation of the new resin has developed improved methods of making the product, and more refined physical testing procedures now permit characterizing the material with greater precision than has heretofore been possible. In the present application these improvements have been combined with the disclosure in the earlier application to provide a fuller description of the new resin.

The styrene-tung oil resins prepared as hereinafter described are clear, substantially colorless, light-resistant products which are harder and somewhat stronger than polystyrene. They are particularly characterized by their exceptionally high impact strength or toughness, by their ready adaptability to fabrication, and by their insolubility in common organic solvents.

The accompanying drawing illustrates graphically the impact strength of a series of styrene-tung oil copolymers containing varying proportions of combined tung oil.

In preparing our new resin a mixture consisting essentially of styrene and between about 0.1 and about 2.0 per cent by weight of raw tung oil is heated in the absence of a solvent for polystyrene at a temperature between about 80° C. and about 140° C. until polymerization is substantially complete, usually in three days or less, although longer times may sometimes be employed. The polymerization according to the invention may, however, be accomplished by any of several other methods employed with styrene, e. g. by allowing the mixture to stand for a long period of time at room temperature or thereabouts, by heating at temperatures above 140° C., or by use of polymerization catalysts, such as benzoyl peroxide, etc. When, as is usually the case, a pure copolymer is desired, the mixture subjected to polymerizing conditions consists only of styrene and tung oil. However, when it is desired to introduce pigments, dyes, plasticizers, etc., into the polymeric product, the polymerization may be carried out in the presence of a small proportion of these materials.

Since tung oil cannot be extracted or steamed out of our new resin, it is believed that all the oil polymerized is chemically combined with the polystyrene, i. e. that the resin is a true copolymer of styrene and tung oil. Infra-red spectroscopic data likewise show that the tung oil is present only in the combined state. When polymerized styrene is merely mixed with tung oil, e. g. by mastication on hot rolls, the mixture obtained does not possess the desirable properties of our new resins.

As stated, the styrene-tung oil copolymers according to the invention comprise tung oil in the proportion of between about 0.1 and about 2.0 per cent by weight of the styrene. When less than about 0.1 per cent of tung oil is copolymerized with styrene, the resins obtained resemble polystyrene, being soluble in organic solvents and having a much lower impact strength than our products. When more than about 2.0 per cent of tung oil is used, the products soften at relatively low temperatures and are of decreased strength.

When a mixture of styrene and tung oil is subjected to polymerizing conditions, these two materials copolymerize to form the tough resinous material of the present invention. However, even after prolonged treatment, absolutely complete polymerization is never achieved. The tung oil is entirely copolymerized, but 1 or 2 per cent of volatilizable material, mostly monomeric styrene together with traces of any impurities present, still remains in the solid resinous product. This volatilizable material does not tend to evaporate from the resin at ordinary temperatures, but, if desired, may be removed by heating the copolymer at elevated temperatures, e. g. 125°-175° C., in a current of inert gas for at least one hour. Such removal of volatilizable material is not essential to the present invention, but may in some instances be desirable. Thus, the tensile strength, hardness and some other properties of the copolymer depend appreciably upon the proportion of volatilizable material present. When these particular properties are of paramount importance, they may be varied within limits as desired by controlling the degree of removal of the volatilizable material from the polymerized product.

Certain of the physical properties of the styrene-tung oil copolymer, particularly its impact strength, are dependent to a large extent upon the proportion of combined tung oil in the material. This effect, in the case of impact strength, is illustrated graphically in the accompanying drawing, from which it is evident that maximum impact strength is obtained on molded objects fabricated from resins containing about 1.0 per cent of copolymerized tung oil. However, it will be noted that all the products within the range of 0.1 to 2.0 per cent of tung oil are much tougher than polystyrene itself.

The following examples are illustrative of our invention but are not to be construed as limiting the scope thereof.

Example 1

A mixture of 99.0 parts by weight of styrene and 1.0 part of tung oil was heated at a temperature of about 125° C. for three days. In this way there was obtained a clear, colorless resinous material which was unusually tough and which had a softening point considerably higher than that of polystyrene. The resin swelled slightly but did not dissolve when contacted with ethyl acetate, naphtha, acetone, ethoxyethanol, carbon tetrachloride, ethylene dichloride, or toluene.

Example 2

A mixture of 99.9 parts of styrene and 0.1 part of tung oil was heated at a temperature of 125° C. for 7 days. A clear, solid copolymer containing 2.63 per cent of volatilizable material was obtained. This resin was then heated at 135°–140° C. for 2 hours in a current of nitrogen, after which treatment only 0.38 per cent of volatilizable material remained in the product. The treated copolymer was ground to a fine powder and compression molded into test specimens at a molding temperature of 130° C. The impact strength of the molded copolymer, as measured on a 5 in. lb. capacity machine of the Izod type (A. S. T. M. 256—34T) using a sample 0.1 in. x 0.5 in. x 0.313 in. overhang was 3.4 in. lbs. The tensile strength, determined on a specimen having a cross-section of 0.065 in. x 0.5 in., was 9700 lbs. per sq. in.

Example 3

A series of mixtures of styrene and tung oil containing tung oil in the proportion 0.0, 0.05, 0.1, 0.5, 1.0, 2.0 and 5.0 per cent by weight were polymerized and the volatilizable material was removed as in Example 2. Each of these samples was then ground and compression molded into three test specimens at the molding temperatures of 130°, 140° and 150° C. and the impact strengths of the specimens were then measured as in Example 2. The results of these tests are illustrated graphically in the accompanying drawing. The specimens containing 0.0, 0.5, and 5.0 per cent of tung oil are outside the scope of the invention, but are given for comparison with the remaining samples.

Other modes of applying the principle of the invention may be employed, change being made as regards the product or method herein disclosed, provided the product or method stated by any of the following claims or the equivalent of such stated product or method be employed.

We therefore particularly point out and distinctly claim as our invention:

1. The method which comprises subjecting a mixture consisting essentially of styrene and between about 0.1 and about 2.0 per cent by weight of tung oil to polymerizing conditions in the absence of a solvent for polystyrene.

2. The method which comprises heating a mixture consisting essentially of styrene and between about 0.1 and about 2.0 per cent by weight of tung oil at a temperature between about 80° C. and about 140° C. in the absence of a solvent for polystyrene until polymerization is substantially complete.

3. The method which comprises heating a mixture consisting of styrene and about 1.0 per cent by weight of tung oil at a temperature between about 80° C. and about 140° C. until polymerization of the mixture is substantially complete.

4. The method which comprises subjecting a mixture consisting essentially of styrene and between about 0.1 and about 2.0 per cent by weight of tung oil to polymerizing conditions in the absence of a solvent of polystyrene, and thereafter heating the product so obtained at a temperature between about 125° and 175° C. in a current of inert gas for at least one hour.

5. The copolymer of styrene and tung oil obtained by polymerizing a mixture consisting essentially of styrene and between about 0.1 and about 2.0 per cent of tung oil, said product being substantially insoluble in common organic solvents and having a high impact strength.

6. The copolymer of styrene and tung oil obtained by polymerizing a mixture consisting of styrene and between about 0.1 and about 2.0 per cent by weight of tung oil, said product being substantially insoluble in common organic solvents and having a high impact strength.

7. The copolymer of styrene and tung oil obtained by heating a mixture consisting of styrene and between about 0.1 and about 2.0 per cent of tung oil at a temperature between about 80° C. and 140° C. until polymerization is substantially complete, said product being substantially insoluble in common organic solvents and having a high impact strength.

8. The copolymer of styrene and tung oil obtained by heating a mixture consisting of styrene and about 1 per cent of tung oil at a temperature between about 80° C. and 140° C. until polymerization is substantially complete, said product being substantially insoluble in common organic solvents and having a high impact strength.

SYLVIA M. STOESSER.
ARNOLD R. GABEL.

CERTIFICATE OF CORRECTION.

Patent No. 2,190,906. February 20, 1940.

SYLVIA M. STOESSER, ET AL.

It is hereby certified that error appears in the printed specification of the above numbered patent requiring correction as follows: Page 2, first column, line 54, Example 3, for "0.5" read 0.05; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.